United States Patent
Shin et al.

(10) Patent No.: US 8,149,305 B2
(45) Date of Patent: Apr. 3, 2012

(54) METHOD AND APPARATUS TO DETECT A DEAD PIXEL OF AN IMAGE SENSOR AND METHOD AND APPARATUS TO CAPTURE AN IMAGE FROM AN IMAGE SENSOR

(75) Inventors: Seung-gi Shin, Suwon-si (KR); Jae-seok Kim, Seoul (KR); Dong-wook Kim, Yongin-si (KR); Hyung-han Lee, Suwon-si (KR); Won-jae Lee, Seoul (KR); Jee-hoon An, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 279 days.

(21) Appl. No.: 11/874,441

(22) Filed: Oct. 18, 2007

(65) Prior Publication Data

US 2008/0239114 A1    Oct. 2, 2008

(30) Foreign Application Priority Data

Mar. 27, 2007   (KR) .................... 10-2007-0029915

(51) Int. Cl.
*H04N 9/64* (2006.01)
(52) U.S. Cl. ...................................................... 348/246
(58) Field of Classification Search .................. 348/246, 348/247
See application file for complete search history.

(56) References Cited

U.S. PATENT DOCUMENTS

| | | | |
|---|---|---|---|
| 4,579,455 A * | 4/1986 | Levy et al. ................... | 356/394 |
| 6,819,358 B1 * | 11/2004 | Kagle et al. .................. | 348/246 |
| 7,580,071 B2 * | 8/2009 | Uchiyama .................... | 348/251 |
| 7,853,099 B2 * | 12/2010 | Shinmei et al. ............... | 382/305 |
| 2002/0085740 A1 * | 7/2002 | Asano et al. ................. | 382/107 |
| 2003/0174902 A1 * | 9/2003 | Barkan ......................... | 382/274 |
| 2004/0041936 A1 | 3/2004 | Uchiyama | |
| 2005/0099516 A1 * | 5/2005 | Kagle et al. .................. | 348/246 |
| 2007/0182862 A1 * | 8/2007 | Li et al. ........................ | 348/701 |

FOREIGN PATENT DOCUMENTS

| | | |
|---|---|---|
| JP | 11-027585 | 1/1999 |
| JP | 11-233580 | 8/1999 |
| JP | 2003-250091 | 9/2003 |
| JP | 2005-210164 | 8/2005 |

OTHER PUBLICATIONS

Chinese Office Action issued Sep. 14, 2010 in CN Application No. 200810088410.0.

* cited by examiner

*Primary Examiner* — Albert Cutler
(74) *Attorney, Agent, or Firm* — Stanzione & Kim, LLP

(57) ABSTRACT

A method and apparatus to detect a dead pixel in an image sensor having a pixel array to generate a plurality of image frames, and a method and apparatus to capture an image from the image sensor detect a dead pixel in the image sensor. A change of a scene of the image frames is sensed, and a detection operation to detect a dead pixel in the pixel array is performed if the change of the scene is sensed.

18 Claims, 6 Drawing Sheets

METHOD AND APPARATUS TO DETECT A DEAD PIXEL OF AN IMAGE SENSOR AND METHOD AND APPARATUS TO CAPTURE AN IMAGE FROM AN IMAGE SENSOR

CROSS-REFERENCE TO RELATED APPLICATIONS

This application claims priority from Korean Patent Application No. 10-2007-0029915 filed on Mar. 27, 2007 in the Korean Intellectual Property Office, the disclosure of which is incorporated herein by reference in its entirety.

BACKGROUND OF THE INVENTION

1. Field of the Invention

The present general inventive concept relates to a method and apparatus to detect a dead pixel of an image sensor and a method and apparatus to capture an image from an image sensor. The general inventive concept also relates to a method and apparatus to quickly and accurately detect a dead pixel in an image sensor on a production line, and also after production and shipment, and a method and apparatus to capture an image from an image sensor.

2. Description of the Related Art

Generally, image-capturing devices such as digital cameras include image sensors capturing images using the properties of a semiconductor that reacts to light.

Each pixel of an image sensor converts light, which is incident through an optical system, into an electrical signal (e.g., a voltage signal) which varies according to the intensity of the incident light. Accordingly, images can be formed in units of pixels.

For various reasons, defective pixels are often generated in the process of manufacturing image sensors. These pixels cannot properly react to light, and an image sensor having such abnormal pixels may output a distorted image. The pixels that cannot properly react to light often appear brighter or darker than intended. Of these pixels, those having a brightness that is noticeably different from that of their neighboring pixels are conventionally referred to as "dead pixels".

The number of dead pixels in an image sensor determines the quality or class of the image sensor. That is, the smaller the number of dead pixels, the better the quality of the image sensor. Errors caused by dead pixels are represented in the form of small dots or lines on a screen. If all image sensor chips having such partial errors are determined to be unacceptable chips, the production yield of the image sensors may be reduced.

In order to prevent the decrease in production yield, rather than disposing of image sensors having such dead pixels, detected dead pixels of image sensors may be corrected.

However, a conventional process of detecting dead pixels is performed within a screen or using a sheet of test patterns. However, many normal pixels are often recognized as dead pixels with this conventional process.

To enhance the quality control, many test patterns may be used to detect all dead pixels. However, this process is not desirable in terms of time and cost.

In addition, special equipment or a special production process is required to detect dead pixels using a sheet or several sheets of test patterns, and thus far there is no method that can be used to detect dead pixels that may become defective after the original detection process.

SUMMARY OF THE INVENTION

The general inventive concept provides a method and apparatus to quickly and accurately detect a dead pixel in an image sensor on a production line and also after production and shipment, and a method and apparatus to capture an image from an image sensor.

Additional aspects and utilities of the present general inventive concept will be set forth in part in the description which follows and, in part, will be obvious from the description, or may be learned by practice of the general inventive concept.

The foregoing and/or other aspects and utilities of the present inventive concept may be achieved by providing a method of detecting a dead pixel in an image sensor that has a pixel array to generate a plurality of image frames. The method includes sensing a change of a scene between first and second image frame sets, each image frame set including at least one of the plurality of image frames; and detecting whether a dead pixel exists in the pixel array if the change of the scene is sensed.

The foregoing and/or other aspects and utilities of the present inventive concept may also be achieved by providing an apparatus to detect a dead pixel in an image sensor that has a pixel array to generate a plurality of image frames. The apparatus includes a scene-change-sensing unit that senses a change of a scene between first and second image frame sets, each image frame set including at least one of the plurality of image frames; and a dead-pixel detection unit operable to detect a dead pixel in the pixel array if the scene-change-sensing unit senses the change of the scene.

The foregoing and/or other aspects and utilities of the present inventive concept may also be achieved by providing a method of capturing an image from an image sensor that has a pixel array for generating a plurality of image frames. The method includes sensing a change of a scene between first and second image frame sets, each image frame set including at least one of the plurality of image frames; detecting whether a dead pixel exists in the pixel array if the change of the scene is sensed; storing location information of the detected dead pixel in the pixel array; and correcting image data based on the location information of the detected dead pixel.

The foregoing and/or other aspects and utilities of the present inventive concept may also be achieved by providing an apparatus to capture an image from an image sensor which has a pixel array to generate a plurality of image frames. The apparatus includes a scene-change-sensing unit that senses a change of a scene between first and second image frame sets, each image frame set including at least one of the plurality of image frames; a dead-pixel detection unit operable to detect a dead pixel in the pixel array if the scene-change-sensing unit senses the change of the scene; a storage unit that stores location information of the detected dead pixel in the pixel array; and a correction unit that corrects the image data based on the location information of the detected dead pixel.

The foregoing and/or other aspects and utilities of the present inventive concept may also be achieved by providing a method of determining the existence of a defective pixel in an image sensor including a plurality of pixels, including generating a first image frame from outputs of the plurality of pixels of the image sensor at a first time period and a second image frame from the outputs of the plurality of pixels of the image sensor at a second subsequent time period, for at a set of the pixels of the plurality of pixels, calculating a difference of a pixel output value of the first image frame and a pixel output value of the second image frame to create a pixel difference value for each of the pixels of the set, determining that a different image has been sensed by the image sensor based on evaluation of the pixel difference values of the pixels of the set, and determining whether the image sensor includes a defective pixel The foregoing and/or other aspects and utilities of the present inventive concept may also be achieved by providing an apparatus, including a memory to store first and second image frames received from an image sensor including a plurality of pixels at first and second time periods, respectively, a first circuit, for at a set of the pixels of the plurality of pixels, operable to determine a difference of a pixel output value of the first image frame and a pixel output value of the second image frame to create a pixel difference value for each of the pixels of the set, a second circuit, operable to determine that a different image has been sensed by the image sensor based on a comparison using the pixel difference values of the pixels of the set and a threshold value, and a third circuit responsive to the second circuit to determine whether the image sensor includes a defective pixel.

The foregoing and/or other aspects and utilities of the present inventive concept may also be achieved by providing a dead-pixel detection unit to determine whether one of pixels of a pixel array is a dead pixel, according to a difference between data of image frames output from the pixels, and a change of a scene of the image frames.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
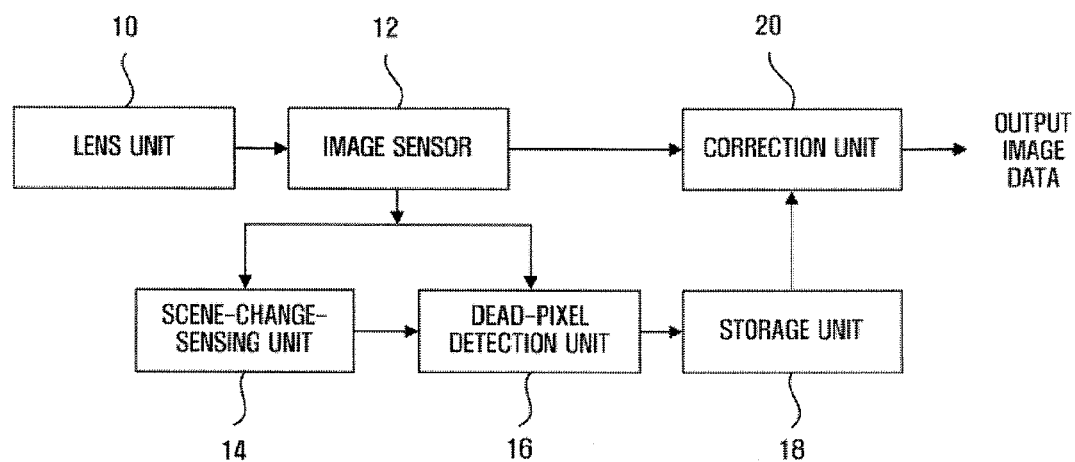
FIG. 1 is a block diagram of an apparatus for capturing an image from an image sensor according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Hereinafter, the present general inventive concept will be described with reference to block diagrams or flowchart illustrations. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus, such that the instructions, which execute via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded into a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of order. For example, two blocks shown in succession may in fact be executed substantially concurrently or the blocks may sometimes be executed in reverse order depending upon the functionality involved.

FIG. 1 is a block diagram of an image-capturing apparatus according to an exemplary embodiment of the present general inventive concept. The term "scene," as used herein, denotes a group of one or more image frames with few or no changes between them.

Referring to FIG. 1, the image-capturing apparatus includes a lens unit 10, an image sensor 12, a scene-change-sensing unit 14, a dead-pixel detection unit 16, a storage unit 18, and a correction unit 20.

The lens unit 10 receives light from an external subject. The image sensor 12 may include an array of pixels outputting digital image data corresponding to the intensity of the light incident on the lens unit 10 to generate an image frame 22. As used herein, positional references to an image frame (e.g., a location or size) refer to the image which the image frame represents. It should be emphasized that, as conventional, data of an image frame 22 may be stored in any convenient manner without regard to location. The scene-change-sensing unit 14 senses the change of a scene composed of one or more image frames 22 output from the image sensor 12. The dead-pixel detection unit 16 detects dead pixels in the pixel array when the scene-change-sensing unit 14 senses a scene change. The storage unit 18 stores location information of the detected dead pixels in the pixel array. The correction unit 20 corrects output image data based on the stored location information of the dead pixels.

Each of the scene-change-sensing unit 14 and the dead-pixel detection unit 16 may be implemented within the image-capturing device in the form of one or more chips. Alternatively, the scene-change-sensing unit 14 and the dead-pixel detection unit 16 may be implemented as an independent device separate from the image-capturing apparatus.

The scene-change-sensing unit 14 senses a scene change using one or more window matrices 24. Each matrix 24 may comprise a cluster of color filters corresponding to each pixel data of an image frame 22 at a certain location of the image frame 22. The cluster of color filters of each matrix 24 may have a predetermined size.

Figure 2:
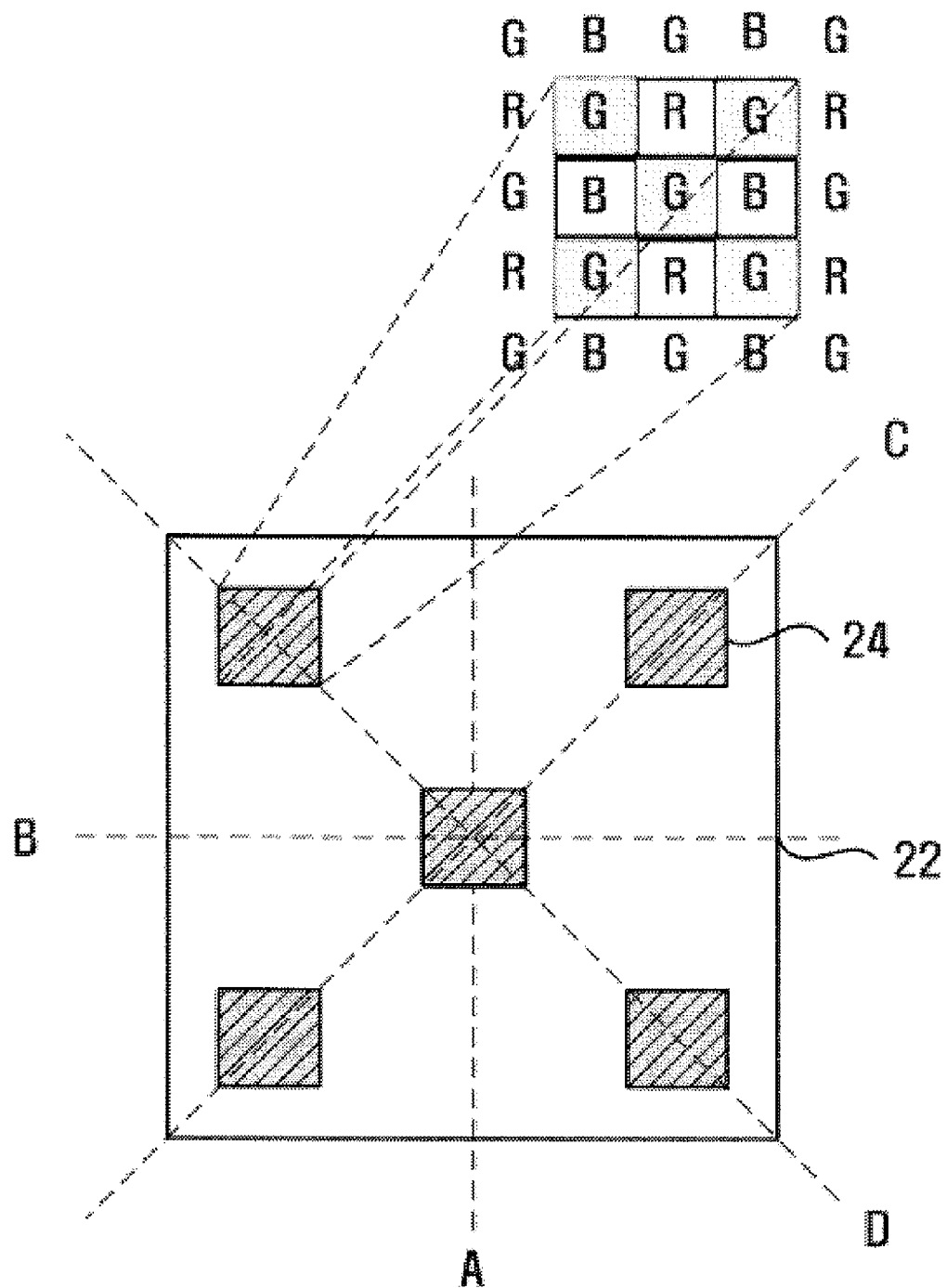
FIGS. 2 and 3 illustrate examples of dispositions of window matrices on an image frame.
Figure 3:
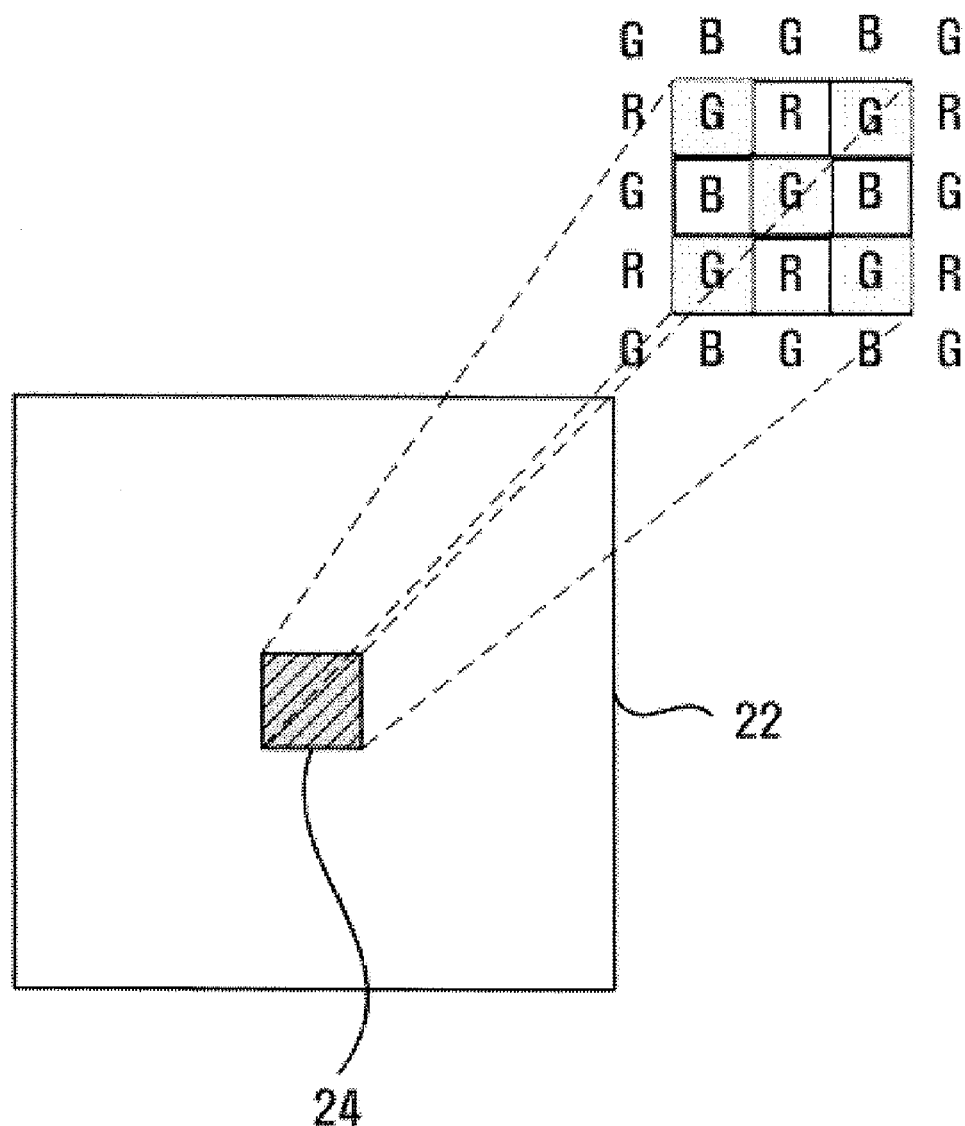

The window matrices 24 may correspond to various locations of each of the image frames 22. For example, the window matrices 24 may correspond to locations disposed symmetrical to each other with respect to a predetermined axis (A, B, C or D) of each of the image frames 22 as illustrated in FIG. 2 or may correspond to locations disposed at the center of each of the image frames 22 as illustrated in FIG. 3. However, the general inventive concept is not limited thereto, and the window matrices 24 may correspond to locations asymmetrically disposed within the image frame 22.

In FIGS. 2 and 3, the number of window matrices 24 of each of the image frames 22 is five and one, respectively. However, the general inventive concept is not limited thereto, and a various number of window matrices 24 can correspond to an image frame 22.

In FIGS. 2 and 3, the size of each of the window matrices 24 is 3×3. However, the general inventive concept is not limited thereto, and the window matrices 24 may have various sizes such as 3×2, 5×5, 7×7, 9×9. In addition, the matrices 24 need not take a square or rectangular shape, but may be another shape (e.g., hexagonal).

If the window matrices 24 correspond to the center of each of the image frames 22 as illustrated in FIG. 3, it may be desirable in terms of scene-change-sensing performance to increase the size of each of the window matrices 24 to, for example, 9×9. The size of the window matrices 24 may be determined according to types and characteristics of mobile devices.

Each of the window matrices 24 is composed of red (R), green (G) and blue (B) color filters. Red, green and blue color information of pixel data is filtered by red, green and blue color filter, respectively. It is desirable but not necessary for each of the window matrices 24 to include a greater number of green color filters, which the eyes are more sensitive to, than the number of red or blue color filters. The window matrices 24 may use the conventional bayer format.

Figure 4:
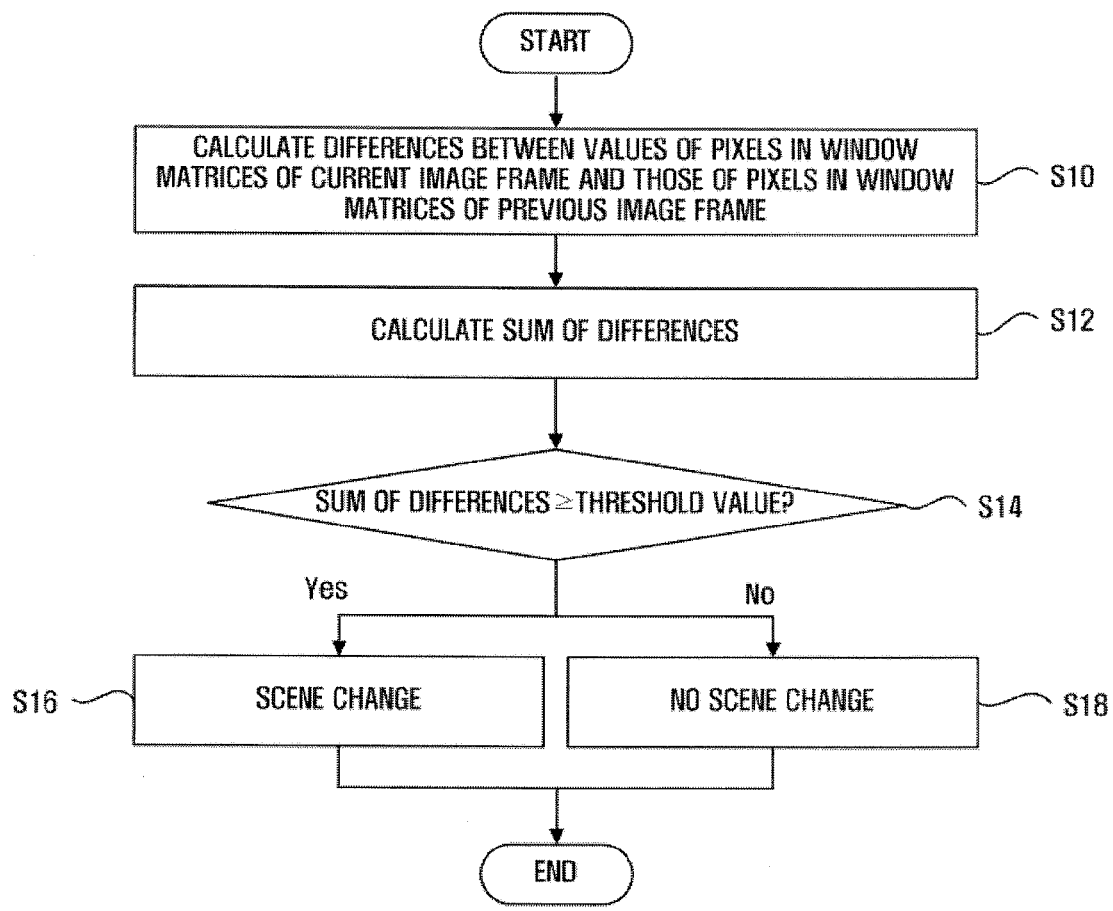
FIG. 4 is a flowchart illustrating a method of sensing a scene change according to an exemplary embodiment of the present general inventive concept.

The scene-change-sensing unit 14 senses a scene change in a flow of operations illustrated in FIG. 4.

Referring to FIG. 4, the scene-change-sensing unit 14 calculates differences between values of at least some of the pixels with color information filtered by the window matrices 24 of a current image frame and the corresponding pixels with color information filtered by the window matrices 24 of the previous image frame (operation S10), and calculates the sum of these differences (operation S12). Then, the scene-change-sensing unit 14 compares the sum of the differences to a preset threshold value (operation S14). If the sum of the differences is greater than the threshold value, the scene-change-sensing unit 14 senses a scene change (operation S16). Conversely, if the sum of the differences is less than the preset threshold value, the scene-change-sensing unit 14 senses no scene change (operation S18). The threshold value is a reference value used to sense a scene change. Neither the previous nor current image frames need to be those associated with images which a user records. Also, the current image frame need not be immediately subsequent to the previous image frame but there may be other generated image frames interposed therebetween. In addition, the current and previous image frames may be taken at different times of operating the image sensor and stored in memory. For example, a first image frame may be stored in non-volatile memory, the device with the image sensor turned off (e.g., the camera is turned off), and the second image frame may be taken at a later time when the device is turned on again.

For example, the scene-change-sensing unit 14 calculates differences between values of green pixels filtered by the window matrices 24 of the current image frame, and those of green pixels filtered by the window matrices 24 of the previous image frame, and calculates the sum of the differences. Then, the scene-change-sensing unit 14 compares the sum of the differences to a threshold value. If the sum of the differences is greater than the threshold value, the scene-change-sensing unit 14 senses a scene change.

A scene change may be determined using the differences between the values of the green pixels filtered by the window matrices 24 of the current image frame, and those of the green pixels filtered by the window matrices 24 of the previous image frame. The scene change may also be determined using the differences between values of all pixels filtered by the window matrices 24 of the current image frame, and those of all pixels filtered by the window matrices 24 of the previous image frame, or the sum of the differences between values of all pixels. When the scene change is determined using the differences between the values of the green pixels or the sum of the differences between the values of the green pixels, the hardware configuration can be simplified.

As described above, the scene-change-sensing unit 14 senses a scene change by calculating differences between values of at least some corresponding pixels of the window matrices 24 of each of current image frame and previous image frame, and comparing the sum of the differences to a threshold value. However, the present general inventive concept is not limited thereto. The scene-change-sensing unit 14 may also sense a scene change by calculating differences between values of at least some corresponding pixels of the window matrices 24 of each of current image frame and previous image frame, and comparing each of the differences to a threshold value. In this case, if any one of the differences is greater than the threshold value, the scene-change-sensing unit 14 senses a scene change. Alternatively, the scene-change-sensing unit 14 may sense the scene change when more than a predetermined number of differences exceed the threshold value. In addition, various methods other than the above methods may be used. The threshold value may take the form of a scalar or a matrix.

Since the configuration of the scene-change-sensing unit 14 according to the present invention can simplify hardware unlike a conventional scene-change-sensing unit, power consumption can be reduced. Hence, the scene-change-sensing unit 14 is particularly suited for mobile devices.

Figure 5:
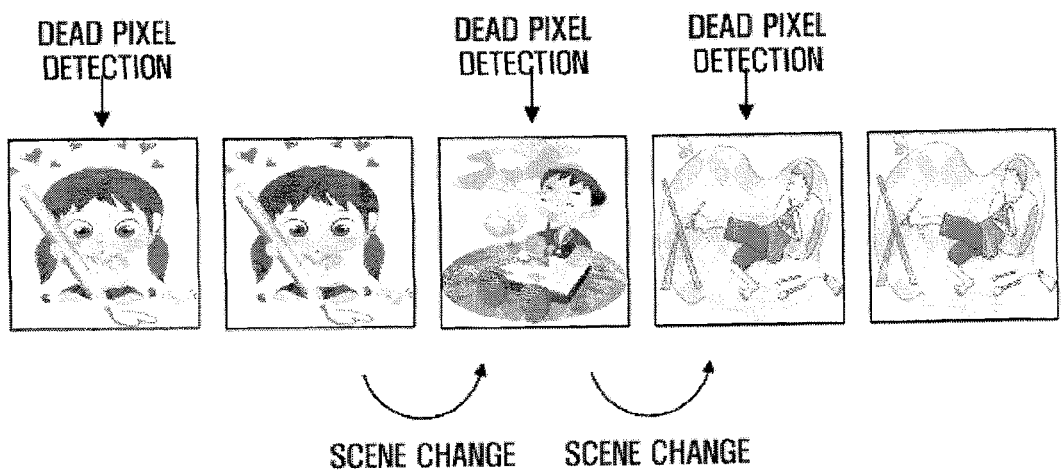
FIG. 5 is a conceptual diagram illustrating the operation of a dead-pixel detection unit of FIG. 1.
Figure 6:
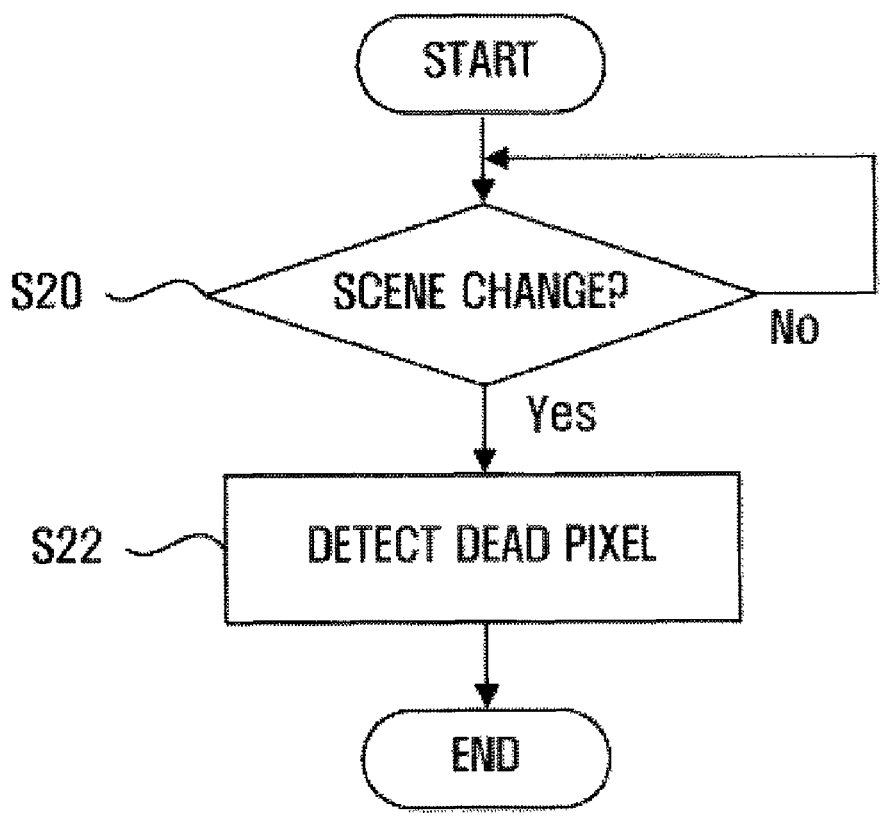
FIG. 6 is a flowchart illustrating a method of detecting a dead pixel in an image sensor according to an exemplary embodiment of the present general inventive concept.

If determining that the scene-change-sensing unit 14 has sensed a scene change, as illustrated in FIGS. 5 and 6 (operation S20), the dead-pixel detection unit 16 detects dead pixels (operation S22). Here, the dead-pixel detection unit 16 operates to detect dead pixels at each scene change. Alternatively, the dead-pixel detection unit 16 may detect dead pixels only when the scene-change-sensing unit 14 first senses a scene change. In addition, the dead-pixel detection unit 16 may detect dead pixels after detecting only some scene-change.

The dead-pixel detection unit 16 receives image frames from a pixel array (not shown), in which a plurality of unit pixels outputting digital image data corresponding to the amount of light are arranged, and detects dead pixels. The dead pixels may be detected using differences between values of pixels in a previous image frame and those of pixels in a current image frame. More specifically, because the previous image frame and the current image frame have been determined by the scene-change-sensing unit 14 to be images of different scenes, it is most likely that the intensity values of the pixels of the images should change significantly. A significant change in the intensity of a pixel after a scene change indicates this pixel is not a dead pixel. No or little change in an intensity value of a pixel after a scene change indicates that this pixel could be a defective pixel. After several scene changes, if the intensity value of a pixel continues to remain unchanged or deviate only slightly, this pixel may be determined to be a dead pixel. A change in the intensity value of a pixel may be considered significant if the magnitude of the difference of the intensity of the pixel in the previous image frame with the intensity of the pixel in the current image frame exceeds a threshold value; the change may be considered insignificant if this magnitude is less than the threshold value. The threshold value may be chosen based on the characteristics of dead pixels of the type of image sensor used. If desired, the determination that this pixel is a dead pixel may be reconsidered if subsequently this pixel's intensity value changes significantly after a scene change, (e.g., it may be determined to be a good pixel after one or several significant intensity changes after a scene change).

The dead-pixel detection unit 16 generates a list of dead pixels in all the image frames 22 in consideration of the differences between the values of the pixels in the current and previous image frames, and continuously compares and reviews the list in order to increase the dead-pixel detection rate and its accuracy. When a scene change is sensed, the list of dead pixels may be compared with the just detected dead pixels and reviewed.

Since the present invention detects dead pixels in all the image frames 22, the dead pixels can be detected more accurately. In addition, since the present invention detects dead pixels at each scene change instead of repeatedly detecting dead pixels at regular time intervals, the time required to detect dead pixels can be reduced.

After the dead pixels are detected, the location information of the detected dead pixels is stored in the storage unit 18. Then, the correction unit 20 corrects and outputs image data based on the stored location information of the dead pixels, thereby preventing distortion in the output image data caused by the dead pixels. The correction of the image data may be done in a conventional manner, such as replacing the intensity value of a dead pixel with a value which is an average of the intensity values of neighboring pixels of the same color as the dead pixel.

Any electronic apparatus, such as a digital camera, which includes the image sensor 12, can be used as the image-capturing apparatus.

The scene-change-sensing unit 14, the dead-pixel detection unit 16, the storage unit 18, and the correction unit 20 can be implemented in an electronic apparatus that will be manufactured and shipped. Therefore, even after the electronic apparatus has been manufactured and shipped, it can quickly and accurately detect dead pixels using the method described above and correct image data based on the detection of the dead pixels.

As described above, according to a method and apparatus to detect a dead pixel in an image sensor and a method and apparatus to capture an image from the image sensor, dead pixels can be quickly and accurately detected not only on a production line but also after production and shipment.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents. As used in this disclosure, the term "preferably" is non-exclusive and means "preferably, but not limited to." Terms in the claims should be given their broadest interpretation consistent with the general inventive concept as set forth in this description. For example, the terms "coupled" and "connect" (and derivations thereof) are used to connote both direct and indirect connections/couplings. As another example, "having" and "including", derivatives thereof and similar transition terms or phrases are used synonymously with "comprising" (i.e., all are considered "open ended" terms)—only the phrases "consisting of" and "consisting essentially of" should be considered as "close ended". Claims are not intended to be interpreted under 112 sixth paragraph unless the phrase "means for" and an associated function appear in a claim and the claim fails to recite sufficient structure to perform such function.

What is claimed is:

1. A method of detecting a dead pixel in an image sensor having a pixel array to generate a plurality of image frames, the method comprising:
   sensing a change of a scene between first and second image frame sets, each image frame set including at least one of the plurality of image frames; and
   if a change of the scene between the first and second image frame sets is detected, detecting whether a dead pixel exists in the pixel array, wherein
   the change of scene is detected when one scene corresponding to the first image frame set is different from another scene corresponding to the second image frame set;
   the sensing of the change of the scene includes:
      calculating differences between values of at least some pixels of a window matrix of a previous image frame and corresponding pixels of a window matrix of a subsequent image frame; and
      determining that the scene has changed by comparing the calculated differences to a predetermined threshold value; and
   a number of the at least some pixels of each of the window matrices is based on an orientation of each of the window matrices within the previous image frame and the subsequent image frame, respectively.

2. The method of claim 1, further comprising:
   calculating the sum of the differences, wherein determining that the scene has changed comprises determining that the scene has been changed if the sum of the differences is greater than the predetermined threshold value.

3. The method of claim 2, wherein the calculating of the sum of the differences comprises calculating the sum of the differences between values of green pixels of the window matrix of a previous image frame and corresponding green pixels of the window matrix of the subsequent image frame.

4. The method of claim 1, wherein the calculating operation includes calculating differences between values of at least some pixels of at least two window matrices of a previous image frame and corresponding pixels of at least two window matrices of a subsequent image frame, wherein window matrices of each of the previous and subsequent image frames are disposed symmetrical to each other with respect to an axis.

5. The method of claim 1, wherein the window matrices are disposed at the center of each of the image frames.

6. An apparatus to detect a dead pixel in an image sensor having a pixel array to generate a plurality of image frames, the apparatus comprising:
   a scene-change-sensing unit that senses a change of a scene between first and second image frame sets, each image frame set including at least one of the plurality of image frames; and
   a dead-pixel detection unit operable to detect a dead pixel in the pixel array if the scene-change-sensing unit senses the change of the scene, wherein the change of scene is when the first image frame set corresponds to one scene and the second image frame set corresponds to a different scene;

the scene-change-sensing unit calculates differences between values of at least some pixels of a window matrix of a previous image frame and corresponding pixels of a window matrix of a subsequent image frame, and determines the change of the scene by comparing the calculated differences to a predetermined threshold value; and a number of the at least some pixels of each of the window matrices is based on an orientation of each of the window matrices within the previous image frame and the subsequent image frame, respectively.

7. The apparatus of claim 6, wherein the scene-change-sensing unit calculates the sum of the differences, and determines that the scene has been changed if the sum of the differences is greater than the predetermined threshold value.

8. The apparatus of claim 7, wherein the scene-change-sensing unit calculates the sum of the differences between values of green pixels of the window matrix of a previous image frame and corresponding green pixels of the window matrix of the subsequent image frame.

9. The apparatus of claim 6, wherein the scene-change-sensing unit calculates differences between values of at least some pixels of at least two matrices of a previous image frame and corresponding pixels of window matrices of a subsequent image frame, and the window matrices of each of the previous image frame and subsequent image frame are disposed symmetrical to each other with respect to an axis.

10. The apparatus of claim 6, wherein the window matrices are disposed at the center of each of the image frames.

11. A method of capturing an image from an image sensor having a pixel array to generate a plurality of image frames, the method comprising:

sensing a change of a scene between first and second image frame sets, each image frame set including at least one of the plurality of image frames;

detecting whether a dead pixel exists in the pixel array if the change of the scene is sensed;

storing location information of the detected dead pixel in the pixel array; and correcting image data based on the location information of the detected dead pixel, wherein sensing the change of a scene includes sensing whether a scene corresponding to the first frame set is different from a scene corresponding to the second image frame set;

the sensing of the change of the scene includes:

calculating differences between values of at least some pixels of a window matrix of a previous image frame and corresponding pixels of a window matrix of a subsequent image frame; and determining that the scene has changed by comparing the calculated differences to a predetermined threshold value; and a number of the at least some pixels of each of the window matrices is based on an orientation of each of the window matrices within the previous image frame and the subsequent image frame, respectively.

12. An apparatus to capture an image from an image sensor having a pixel array to generate a plurality of image frames, the apparatus comprising:

a scene-change-sensing unit that senses a change of a scene between first and second image frame sets, each image frame set including at least one of the plurality of image frames;

a dead-pixel detection unit operable to detect a dead pixel in the pixel array if the scene-change-sensing unit senses the change of the scene;

a storage unit that stores location information of the detected dead pixel in the pixel array; and a correction unit that corrects image data based on the location information of the detected dead pixel, wherein the change of a scene between the first and second image frame sets is when the first image frame set corresponds to one scene and the second image frame set corresponds to a different scene;

the scene-change-sensing unit calculates differences between values of at least some pixels of a window matrix of a previous image frame and corresponding pixels of a window matrix of a subsequent image frame, and determines the change of the scene by comparing the calculated differences to a predetermined threshold value; and a number of the at least some pixels of each of the window matrices is based on an orientation of each of the window matrices within the previous image frame and the subsequent image frame, respectively.

13. A method of determining the existence of a defective pixel in an image sensor including a plurality of pixels, comprising:

generating a first image frame from outputs of the plurality of pixels of the image sensor at a first time period and a second image frame from the outputs of the plurality of pixels of the image sensor at a second subsequent time period;

for a set of the pixels of the plurality of pixels, calculating a difference of a pixel output value of the first image frame and a pixel output value of the second image frame to create a pixel difference value for each of the pixels of the set;

determining that a different scene has been sensed by the image sensor based on evaluation of the pixel difference values of the pixels of the set; and determining whether the image sensor includes a defective pixel, wherein a number of pixels included in the set of pixels of the plurality of pixels is based on an orientation of the set of pixels of the plurality of pixels within each of the first and second image frames, respectively.

14. The method of claim 13, wherein the operation of determining that a different scene has been sensed includes determining that a different scene has been sensed by the image sensor by comparing each pixel difference value with a threshold value.

15. The method of claim 13, wherein the operation of determining that a different scene has been sensed includes determining that a different scene has been sensed by the image sensor by comparing a sum of at least some of the pixel difference values with a threshold value.

16. The method of claim 13, wherein the operation of determining whether the image sensor includes a defective pixel includes, for each pixel to be tested for a defect, calculating a difference of the tested pixel output value of the first image frame and the tested pixel output value of the second image frame.

17. The method of claim 16, wherein the operation of determining whether the image sensor includes a defective pixel further includes determining a tested pixel to be defective when the difference of the tested pixel output value of the first image frame and the tested pixel output value of the second image frame is less than a threshold value.

18. The method of claim 16, wherein:
the operations of generating first and second image frames, calculating differences of pixel output values, and determining that a different scene has been sensed by the image sensor based on evaluation of the pixel difference values of the pixels of the set are performed for multiple sets of first and second image frames; and the operation of determining whether the image sensor includes a defective pixel further includes determining a tested pixel to be defective when the difference of the tested pixel output value of the first image frame and the tested pixel output value of the second image frame is less than a threshold value for the multiple sets of first and second image frames.

* * * * *